United States Patent [19]
Kojima et al.

[11] Patent Number: 5,235,607
[45] Date of Patent: Aug. 10, 1993

[54] SOLID-STATE LASER DEVICE AND MACHINING APPARATUS

[75] Inventors: Minoru Kojima; Mitsugu Terada, both of Sodegaura; Kazuyoshi Sutoh; Takahiro Uchida, both of Noda, all of Japan

[73] Assignee: Mitsui Petrochemical Industries, Ltd., Tokyo, Japan

[21] Appl. No.: 810,299

[22] Filed: Dec. 19, 1991

[30] Foreign Application Priority Data

Dec. 27, 1990 [JP] Japan ................... 2-408364
Dec. 27, 1990 [JP] Japan ................... 2-408365
Jan. 24, 1991 [JP] Japan ................... 3-007308

[51] Int. Cl.$^5$ ................................. H01S 3/13
[52] U.S. Cl. ................... 372/29; 372/39; 372/40; 372/70; 372/92; 372/98; 372/109
[58] Field of Search ............. 372/39, 40, 6, 7, 9, 372/14, 25, 92, 98, 70, 71, 64, 66, 68, 29, 34, 109; 219/121.6, 121.61, 121.62

[56] References Cited

U.S. PATENT DOCUMENTS

| | | | |
|---|---|---|---|
| Re. 31,279 | 6/1983 | Mefferd et al. | 372/34 X |
| 3,553,604 | 1/1971 | Andress et al. | 372/29 X |
| 3,626,325 | 12/1971 | Smith | 372/34 X |
| 3,636,473 | 1/1972 | Young | 372/40 |
| 3,781,709 | 12/1973 | Hintringer | 372/29 X |
| 4,387,462 | 6/1983 | Markus | 372/34 X |
| 4,574,180 | 3/1986 | Kasner et al. | 219/121 LY |
| 4,644,554 | 2/1987 | Sheng | 372/34 X |
| 4,697,269 | 9/1987 | Ohara | 372/34 |
| 4,792,961 | 12/1988 | Kearsley | 372/34 X |
| 4,809,283 | 2/1989 | Harter | 372/34 X |
| 4,858,242 | 8/1989 | Kuper et al. | 372/34 X |
| 5,050,184 | 9/1991 | Nelson | 372/34 X |

Primary Examiner—Brian Healy
Attorney, Agent, or Firm—Sherman and Shalloway

[57] ABSTRACT

According to the present invention there are provided a solid-state laser device using a laser rod not smaller than 180 mm in length as a laser medium, thereby capable of providing a high output power, facilitating maintenance and inspection, and permitting the reduction of size and simplification in comparison with a conventional laser device using plural laser rods, as well as a machining apparatus using the said laser device as a machining energy source, and a solid-state laser device wherein a laser medium is held in a free state within a resonator so that a longitudinal direction of the laser medium is coincident with an optical axis direction of laser beam and so that the laser medium is capable of expansion or contraction in the said optical axis direction, thereby preventing the breakage of the laser medium and the deviation of the optical axis of laser beam.

10 Claims, 8 Drawing Sheets

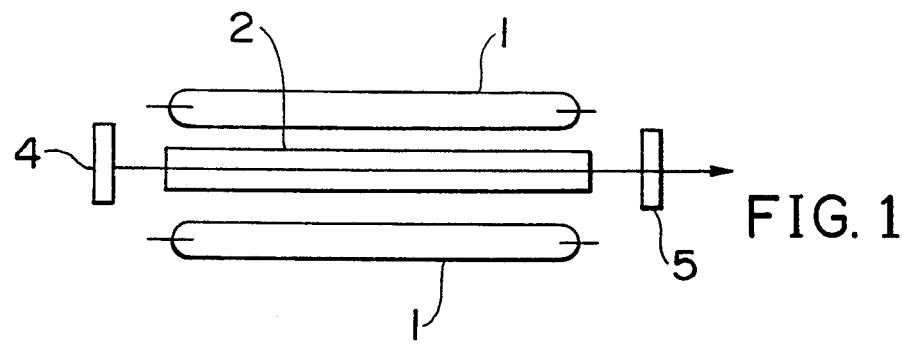
FIG. 1
FIG.2
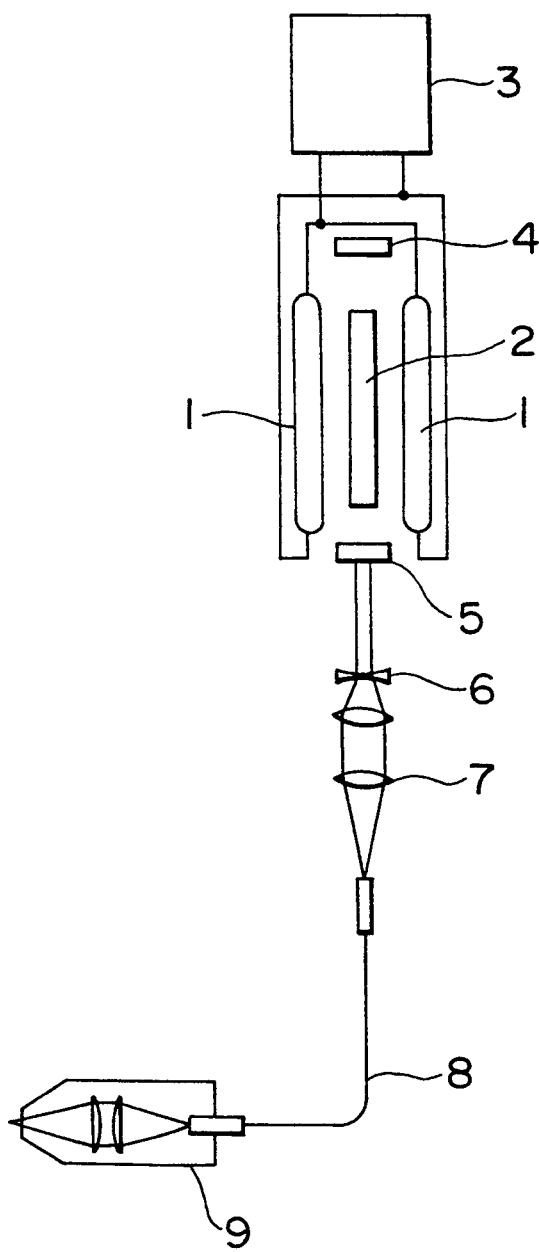

SOLID-STATE LASER DEVICE AND MACHINING APPARATUS

BACKGROUND OF THE INVENTION

The present invention relates to a solid-state laser device, a machining apparatus using the same, and a solid-state laser device having a movable laser medium holding means.

Recently, the development of laser devices as light source devices has been pushed and is now approaching a practical application stage. Particularly, a laser device wherein a laser medium crystal is excited by the emission of light from an excitation lamp is laser beam over a wide wavelength range from visible to infrared, depending on the kind of the crystal used.

Such lasers using crystals are generically called solid-state lasers and various kinds of solid-state lasers have been developed and used practically, using yttrium-aluminum-garnet doped with neodymium (hereinafter referred to as Nd:YAG), titanium-doped sapphire, ruby, alexandrite, etc. as laser media.

A low beam divergence is a characteristic feature of laser beam, and by utilizing this feature it is made possible to radiate a small dense spot of energy. Among the aforementioned laser crystals, Nd:YAG has a wavelength of 1.06 $\mu$m falling under the infrared region and is in wide use mainly for machining using laser.

Laser devices using Nd:YAG laser, as well as machining apparatus using the laser devices such as laser welders and cutters, have been used for welding or cutting of small parts, e.g. electronic parts, because of small power. In these welders or cutters, the laser output is 400 W or so in normal use.

For increasing the laser power, there have been adopted a laser device using two excitation lamps to double the excitation energy; a laser device of a cascade structure wherein two laser rods are arranged in series and there are also arranged two excitation lamps, as shown in FIG. 11; a machining apparatus using laser wherein a plurality of laser rods are arranged in series, as shown in FIG. 12; and a machining apparatus using laser wherein a plurality of laser rods are arranged in parallel, as shown in FIG. 13.

In FIGS. 11 to 13, the reference numeral 1 denotes an excitation lamp, the numeral 2 denotes a laser rod, numeral 3 a power source, numeral 4 a total reflection mirror, numeral 5 an output mirror, numeral 6 a magnifying optical system, numeral 7 a coupling lens for fiber, numeral 8 an optical fiber, and numeral 9 an optical output coupler (emitting unit).

Such machining apparatus using plural laser rods have gradually come to be used as welders in response to the demand for "replacing a contact type electric welding with a non-contact type laser welding to improve the working efficiency" from the industrial world. Like cutters using laser have also been provided.

Further, as a high power type machining apparatus using laser, there has been provided a laser cutter using a carbon dioxide gas laser of 10.6 $\mu$m in wavelength as a light source. This type of a laser cutter having an output power of 1 kW or more can be obtained easily.

In such machining apparatus using plural laser rods, however, there is a common problem that since the number of parts is increased accordingly in comparison with the use of a single laser rod, it is not easy to effect maintenance and inspection, the apparatus becomes larger in size or complicated, and the power consumption also increases.

In the foregoing laser welders and cutters using plural laser rods, the adjustment of the laser device itself takes much time although such a maintenance item as electrode replacement in electric welding is excluded. More particularly, in the apparatus of such construction as illustrated in FIG. 12, since the rods are arranged in series, it is difficult to make the characteristics of the laser rods conform to one another, e.g. alignment of the optical axes of the laser rods. Also, in the apparatus of such construction as illustrated in FIG. 13, a problem is encountered in the adjustment of a resonator system of each laser device because there are used plural resonator systems, excitation lamp sources and cooling-water circulating systems.

As to a cutter using a carbon dioxide gas laser, it is difficult to use it in a cutting operation requiring flexibility because laser beam cannot be transmitted using an optical fiber. Further, the material of a reflecting mirror, etc. used in an optical system is restricted to zinc selenide for example and the damage caused by splash of molten metal occurs very frequently during the cutting operation, thus requiring replacement, with the result that the operating cost becomes very high.

On the other hand, in a solid-state laser device using a laser rod of Nd:YAG for example as a laser medium, at the time when the laser rod is excited by means of an excitation lamp, cooling water is circulated continually to cool the laser rod and thereby prevent the storage of heat caused by the excitation. In this laser device, both ends of the laser rod are each held by a cylindrical holder. More specifically, one end portion of the laser rod is inserted into one cylindrical holder and fixed thereto in a liquid-tight state using an O-ring, while the other end portion of the laser rod is inserted into the other cylindrical holder and fixed thereto also in a liquid-tight state using an O-ring. Consequently, both end faces of the laser rod are isolated from the cooling water; that is, the end faces are prevented from coming into contact with the cooling water which would cause the adhesion of foreign matter in the cooling water to the end faces resulting in impairment of the laser oscillation. The cylindrical holders are fixed to the resonator body.

Even if the laser rod is cooled by the cooling water as mentioned above, it is difficult to completely remove a thermal influence on the laser rod. With increase in the luminous intensity of the excitation lamp, the thermal influence on the laser rod becomes more conspicuous to the extent of causing expansion of the laser rod. In this case, if both ends of the laser rods are fixed completely, there may occur breakage of the laser rod. The longer the laser rod, the more conspicuous this tendency.

Conversely, if the rod is not fixed, there will arise a deviation problem of the optical axis of laser beam.

SUMMARY OF THE INVENTION

It is the first object of the present invention to provide a solid-state laser device and a machining apparatus using the same, capable of affording a high output power, easy to effect maintenance and inspection and permitting the reduction of size or simplification as compared with the conventional apparatus using plural laser rods.

It is the second object of the present invention to provide a laser device involving no likelihood of breakage of a laser medium nor likelihood of deviation of the optical axis of laser beam.

A solid-state laser device according to the first present invention is characterized by having a single laser rod and an excitation light source for exciting the laser rod and in that the length of said laser rod is not smaller than 180 mm.

A machining apparatus using laser according to the present invention is characterized by including as an energy source (source of light and heat) the above solid-state laser device provided with a single laser rod not smaller than 180 mm in length and an excitation light source for exciting the laser rod.

A solid-state laser device according to the second present invention is provided within the body of a resonator with a light source for excitation and a laser medium which is excited with light emitted from the said light source, and is characterized in that said laser medium is held within the body of the resonator in a free state so as to be capable of expansion or contraction in an optical axis direction of laser beam in conformity with the optical axis direction.

First, the solid-state laser device and the machining apparatus using the same both according to the first present invention will be outlined below.

SOLID-STATE LASER DEVICE OF THE FIRST INVENTION AND MACHINING APPARATUS USING THE SAME

The solid-state laser device of the first invention and the machining apparatus using the same are characterized by using a single laser rod not smaller than 180 mm, preferably 180 to 350 mm in length as a laser medium.

As examples of the laser rod as referred to herein there are mentioned such solid-state lasers as yttrium-aluminum-garnet doped with neodymium (Nd:YAG), Nd:glass, ruby, alexandrite, titanium-doped sapphire, with Nd:YAG being preferred.

It is necessary that the laser rod used in the present invention and just exemplified above, e.g. Nd:YAG laser crystal, be not smaller than 180 mm in length. Although the upper limit of the laser rod length has previously been 150 mm, it became possible to obtain such a laser rod not smaller than 180 mm in length as that used in the present invention with the improvement of the single crystal growing and pulling technique.

In the case of a conventional longest 150 mm Nd:YAG laser rod, a maximum power is 400 W. On the other hand, by using single laser rod not shorter than 180 mm there can be obtained an output power of 750 W or more, particularly 800 W or more. In the present invention, a plurality of the laser rods having the above-mentioned length can be arranged and adhered in series for using as a long laser rod.

The machining apparatus using laser according to the present invention utilizes such solid-state laser device as an energy source in a welder, a cutter, or the like.

In the solid-state laser device of the first invention and the machining apparatus using the same as an energy source according to the present invention, there can be attained high power in a smaller or simpler structure than in the prior art by the use of a laser rod not shorter than 180 mm, and thus construction is the simplest, using only one laser rod. Therefore, both maintenance such as device adjustment and inspection are easy.

Next, the solid-state laser device according to the second present invention will be outlined below.

SOLID-STATE LASER DEVICE OF THE SECOND INVENTION

A characteristic feature of the solid-state laser device according to the second present invention resides in the laser medium holding means.

The shape of the laser medium is not specially limited if only it is employable in laser oscillation. Examples are rod-like shapes such as columnar and prismatic shapes, as well as plate-like shapes. Preferred are rod-like shapes, especially a columnar shape.

In the case of a rod- or plate-like laser medium, it is usually disposed within the body of a resonator so that its longitudinal direction runs along the optical axis of laser beam. In this case, the laser medium is held within the resonator body in a free state so as to be capable of expansion (or extension) or contraction in its longitudinal direction, namely in the optical axis direction of laser beam. This point is important in the present invention.

Various forms are considered as laser medium holding means. For example, one end portion of the laser medium is held by one rod holder and the other end portion thereof is held by another rod holder, at least one of both rod holders being held in the body of a resonator in a free state so that the laser medium is capable of expansion (or extension) or contraction in its longitudinal direction. In this case, both rod holders may be movable in longitudinal direction of the laser medium, or one may be fixed to the resonator body and the other made movable.

The latter is suitable, and in this case one rod holder which holds one end portion of the laser medium is fixed to the resonator body, while the other rod holder which holds the other end portion of the laser medium is held in the resonator body in a free state to make the laser medium capable of expansion or contraction in the longitudinal direction thereof.

For making the rod holder movable, the rod holder may be held slidably to the resonator body by a slide holder means. For example, the rod holder and the resonator body are in slidable face contact with each other, or there is used a slide holder means such as a bearing.

According to an example of the movable rod holder, one end portion of the rod holder holds an end portion of a laser medium, while the other end portion thereof projects from the resonator body and is held by an auxiliary fixing member which is connected to the resonator body through an elastic connector.

The rod holder may be made movable in the longitudinal direction of the laser medium and fixed to the resonator body through a spring. This is also effective in absorbing the expansion and contraction of the laser medium and fixing the same medium.

Although in the above example the rod holder is rendered movable, thereby making the laser medium movable in the longitudinal direction thereof, it is also possible to make the laser medium itself capable of expansion or contraction to the rod holder. Also in this case, the rod holder can hold the laser medium in a free state so that the laser medium is capable of expansion or contraction longitudinally.

Preferably, both end portions of the laser medium are held by rod holders and at least one of the rod holders holds the laser medium in a free state so that the laser medium is capable of expansion or contraction in the longitudinal direction thereof.

The laser medium to be used is not specially limited if only it is a solid-state laser medium. Concrete examples (including preferred examples) thereof are as mentioned previously in connection with the first solid-state laser device and the machining apparatus using the same.

The number of such laser medium and that of the excitation lamp for radiating an excitation light to the laser medium are not specially limited. Each may be used one or in a plural number.

In the present invention, moreover, the diameter and length of the laser medium are not specially limited. However, the longer the laser medium, the larger the thermal expansion, so it is desirable to use a long laser medium, for example, 180 mm or more, in length.

In the solid-state laser device of the second invention, heat is generated by an optical pumping action of a laser medium and the laser medium expands under the influence of the heat. This thermal expansion is absorbed by expansion or extension of the laser medium because the laser medium is held within the body of a resonator in a free state so as to be capable of expansion or contraction in an optical axis direction of laser beam.

More specifically, in the case where both ends of the laser medium are held by rod holders, if one rod holder is fixed to the resonator body, while the other rod holder is movable to the resonator body and consequently the laser medium is in a free state so as to be capable of expansion or contraction in the longitudinal direction thereof, the aforesaid thermal expansion is absorbed by the longitudinal movement of the laser medium which moves together with the other rod holder.

Further, as long as rod holders hold the laser medium in a free state for longitudinal movement of the laser medium, even if the rod holders are fixed, the laser medium can move and absorb the expansion thereof.

Thus, in the solid-state laser device according to the second present invention, since the thermal expansion of the laser medium can be absorbed by expansion or extention in longitudinal direction thereof, there is no fear of the laser medium being destroyed by distortion induced by expansion, nor will there be any deviation of the optical axis of laser beam because the distortion is absorbed by movement in the optical axis direction. Further, it is possible to enlarge the input energy and hence possible to enlarge the output power.

BRIEF DESCRIPTION OF THE DRAWINGS

FIG. 1 is a schematic view of a solid-state laser device embodying the first present invention;

FIG. 2 is a schematic view of a machining apparatus using laser embodying the first invention;

DESCRIPTION OF THE PREFERRED EMBODIMENTS

Figure 3:
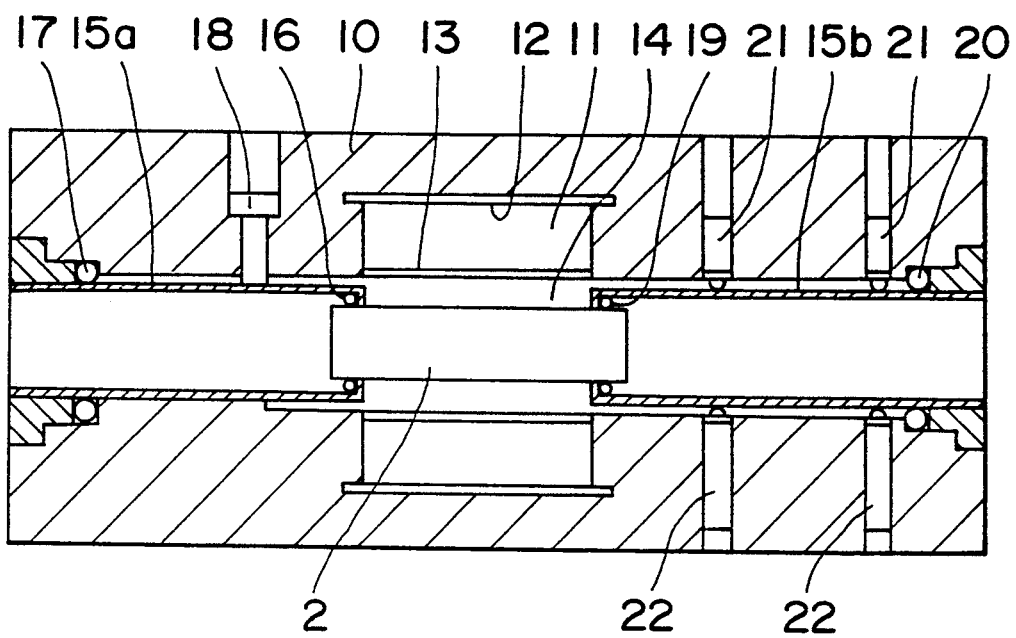
FIG. 3 is a front view in vertical section of a solid-state laser device embodying the second invention.

Embodiments of the solid-state laser device of the first invention, machining apparatus using laser and solid-state laser device according to the second present invention will be described hereinunder with reference to the accompanying drawings.

EXAMPLE 1

FIG. 1 illustrates a solid-state laser device embodying the first present invention, which is provided with a single laser rod 2 of Nd:YAG, excitation lamps 1 for excitation of the laser rod, a total reflection mirror 4 and an output mirror 5.

The laser rod 2 has a length of 185 mm and a diameter of 10 mm. The excitation lamps 1 are each a xenon lamp having an effective length of 190 mm and a bore diameter of 10 mm.

The total reflection mirror 4 and the output mirror 5 are disposed on an extension line of a major axis of the laser rod 2 and on both sides of the laser rod.

When laser oscillation was conducted using this laser device, the laser output power was 1005 W at a pulse width of 10 msec and repetition 10 pps (at input power 40 kW), and the laser power was 803 W at a pulse width of 7.2 msec and repetition 10 pps at input power 34 kW.

EXAMPLE 2

FIG. 2 is a construction diagram of a welder using laser as a machining apparatus using laser embodying the present invention, in which a cooling system is omitted.

In the same figure, the parts indicated by the reference numeral 1 are a pair of excitation lamps as excitation sources, and a laser rod 2 of Nd:YAG is interposed between the paired excitation lamps 1. A power source 3 is connected to the excitation lamps 1 to supply electric power for excitation to the lamps.

On an extension line of the laser rod 2 and on both sides of the rod there are disposed a total reflection mirror 4 and an output mirror 5.

A magnifying optical system 6 for receiving laser beam from the output mirror 5 is disposed in front of the output mirror. The laser beam which has passed through the magnifying optical system 6 is introduced into an optical fiber 8 through a coupling lens 7 for fiber.

At a front end of the optical fiber 8 there is provided an optical output coupler 9 constituted by a condenser lens, and welding or cutting is performed with the laser beam emitted from the optical output coupler 9.

When the excitation lamps 1 are turned ON by the power source to excite the Nd:YAG laser rod 2, light is amplified by a resonator system comprising the total reflection mirror 4 and the output mirror 5 and a laser beam of 750 W or more in output is radiated.

The laser beam passes through the optical fiber 8 and is focused thereby, then is emitted from the optical output coupler 9. With this focused laser beam there is performed welding or cutting.

The laser rod 2 used in the apparatus of this embodiment was 185 mm in length and 10 mm in diameter, and the excitation lamps used were each a xenon lamp having an effective length of 190 mm and a bore diameter of 10 mm. When laser oscillation was performed, there was obtained a laser power of 803 W at a pulse width of 7.2 msec and repetition 10 pps at input power 34 kW, and 1005 W at a pulse width of 10 msec and repetition 10 pps at input power 40 kW. The welding and cutting operations were performed in a satisfactory manner.

EXAMPLE 3

A solid-state laser device embodying the second present invention will be described below with reference to FIGS. 3 to 6. FIG. 3 is a longitudinal sectional view thereof.

Within a resonator body 10 is provided a chamber 11 having a double ellipse-shaped section and having a mirror surface 12 as a wall surface formed by a vapor-deposited metallic film. A laser rod 2 as a laser medium is disposed through a central focus of the double ellipse, namely, a focus common to both ellipse, in such a manner that the longitudinal direction thereof runs along the optical axis of laser beam. Further, a lamp 1 for excitation is disposed through another focal point of each ellipse.

The laser rod 2 is accommodated within a transparent glass tube 13, which is located within the chamber 11 and is in communication with the interior of the resonator body 10. The interior of the transparent tube 13 and the resonator body 10 are filled with a cooling liquid 14, e.g. water, to cool the laser rod 2.

The laser rod 2 is in the shape of a rod, more concretely, a column, having a length of 185 mm and a diameter of 10 mm, and both ends thereof are held by a pair of cylindrical rod holders 15a and 15b, respectively. The paired cylindrical rod holders 15a and 15b are accommodated within the resonator body 10, and one end portion of the laser rod 2 is held in a liquid-tight manner by one rod holder 15a, while the other end portion of the laser rod 2 is held in a liquid-tight manner by the other rod holder 15b, whereby both end faces of the laser rod 2 are isolated from the cooling liquid 14 and face outwards.

More specifically, one rod holder 15a positioned on the left-hand side in FIG. 3 holds one end portion (left end portion) of the laser rod 2 at the other end (right end) thereof in an enclosing manner. To this holding portion is fixed an O-ring 16, which maintains the liquid tightness between the rod holder and the laser rod 2.

Also, an O-ring 17 is fitted on the outer periphery of one end portion (left end portion) of one rod holder 15a to maintain the liquid tightness between the rod holder and the resonator body 10. The rod holder 15a is fixed to the resonator body 10 with a fixing bolt 18 extending through the resonator body.

On the other hand, the other rod holder 15b positioned on the right-hand side in FIG. 3 holds the other end portion (right end portion) of the laser rod 2 at one end (left end) thereof in an enclosing manner. To this holding portion is fixed an O-ring 19, whereby the liquid tightness between the rod holder and the laser rod 2 is maintained.

Also, an O-ring 20 is fitted on the outer periphery of the other end position (right end portion) of the other rod holder 15b to maintain the liquid tightness between the rod holder and the resonator body 10.

Figure 4:
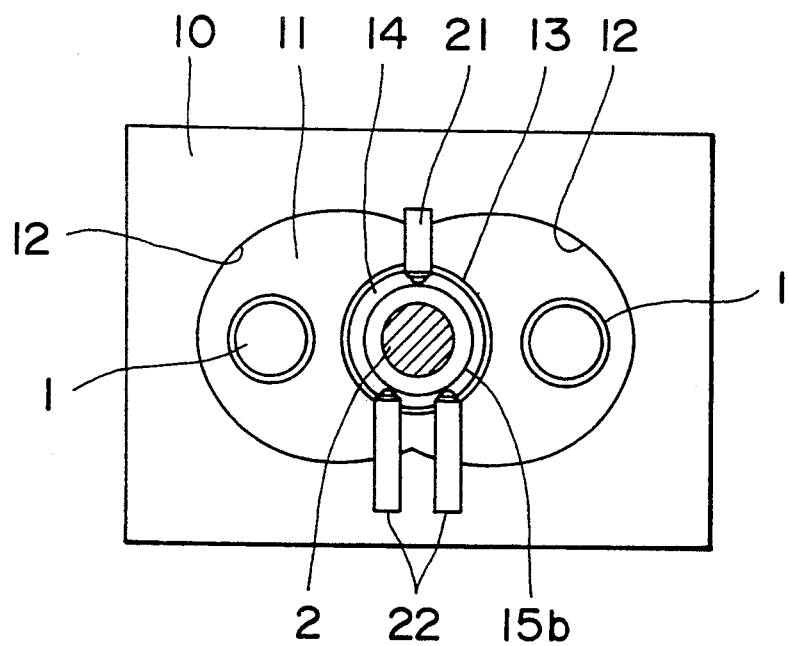
FIG. 4 is a side view in vertical section of FIG. 3.

In the sectional view of FIG. 4, the upper side of the other rod holder 15b is held by one ball plunger 21 and the lower side thereof held by two screws 22 each having a free ball. And there are provided two sets each consisting of one such ball plunger 21 and two such screws 22 with free balls, as shown in FIG. 3.

Figure 5:
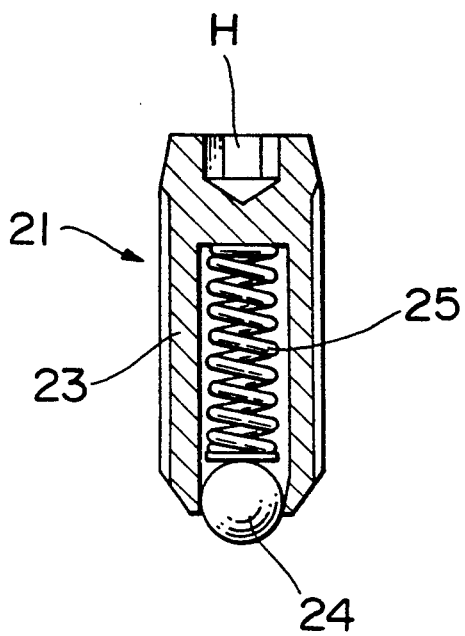
FIG. 5 a sectional view showing means (a ball plunger) for holding a rod holder in a free state so as to be movable in a longitudinal direction of a laser medium, which is used in the solid-state laser device of the second invention.

According to the structure of the ball plunger 21 illustrated in FIG. 5, a metallic ball 24 is fitted in a front end of a screw body 23 having a threaded peripheral surface. The metallic ball 24 is rotatable and is urged in a projecting direction from the front end of the screw body 23 by means of a spring 25 disposed in the interior of the screw body. A hexagonal wrench hole H is formed in the head of the screw body 23.

Figure 6:
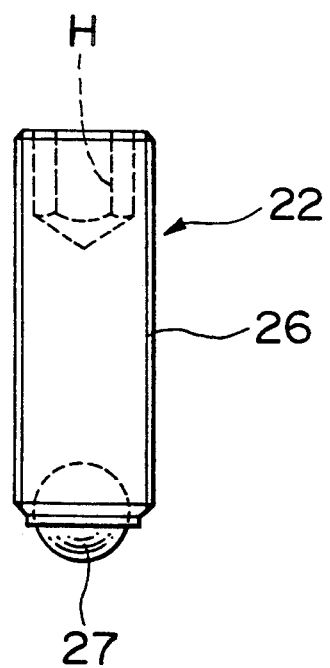
FIG. 6 is a sectional view showing means (a screw with free ball) for holding a rod holder in a free state so as to be movable in a longitudinal direction of a laser medium, which is also used in the solid-state laser device of the second invention.

According to the structure of the screw 22 with free ball illustrated in FIG. 6, a metallic ball 27 is fitted in a front end of a screw body 26 having a threaded peripheral surface, the metallic ball 27 being rotatable. And a hexagonal wrench hole H is formed in the head of the screw body 26.

Through the ball plunger 21 and the screw 22 with free ball, the other rod holder 15b is held by the resonator body 10 in a free state so as to be movable in its longitudinal direction, namely, in the longitudinal direction of the laser rod 2.

Light from the excitation lamps 1 is reflected by the mirror surface 12 and is focused to the laser rod 2, whereby an optical pumping action is created and laser beam is radiated in the longitudinal direction of the laser rod.

This excitation of laser rod 2 causes the generation of heat to the laser rod 2. Although the generated heat is absorbed by the cooling liquid, there occurs an expanding phenomenon of the laser rod due to the heat generation. Upon expansion of the laser rod 2, the resulting stress causes the laser rod itself to extend in its longitudinal direction.

As a result, the rod holder 15b is pushed and tries to move longitudinally. Although one rod holder 15a is fixed to the resonator body 10, the other rod holder 15b is held in a free state in the longitudinal direction of the resonator body, so moves longitudinally together with the laser rod 2 and absorbs the expansion of the laser rod. Therefore, there is no fear of the laser rod being destroyed by distortion caused by such expansion and it is possible to enlarge the input energy and hence enlarge the output power, compared with a conventional solid-state laser in which a laser medium is fixed.

Figure 7:
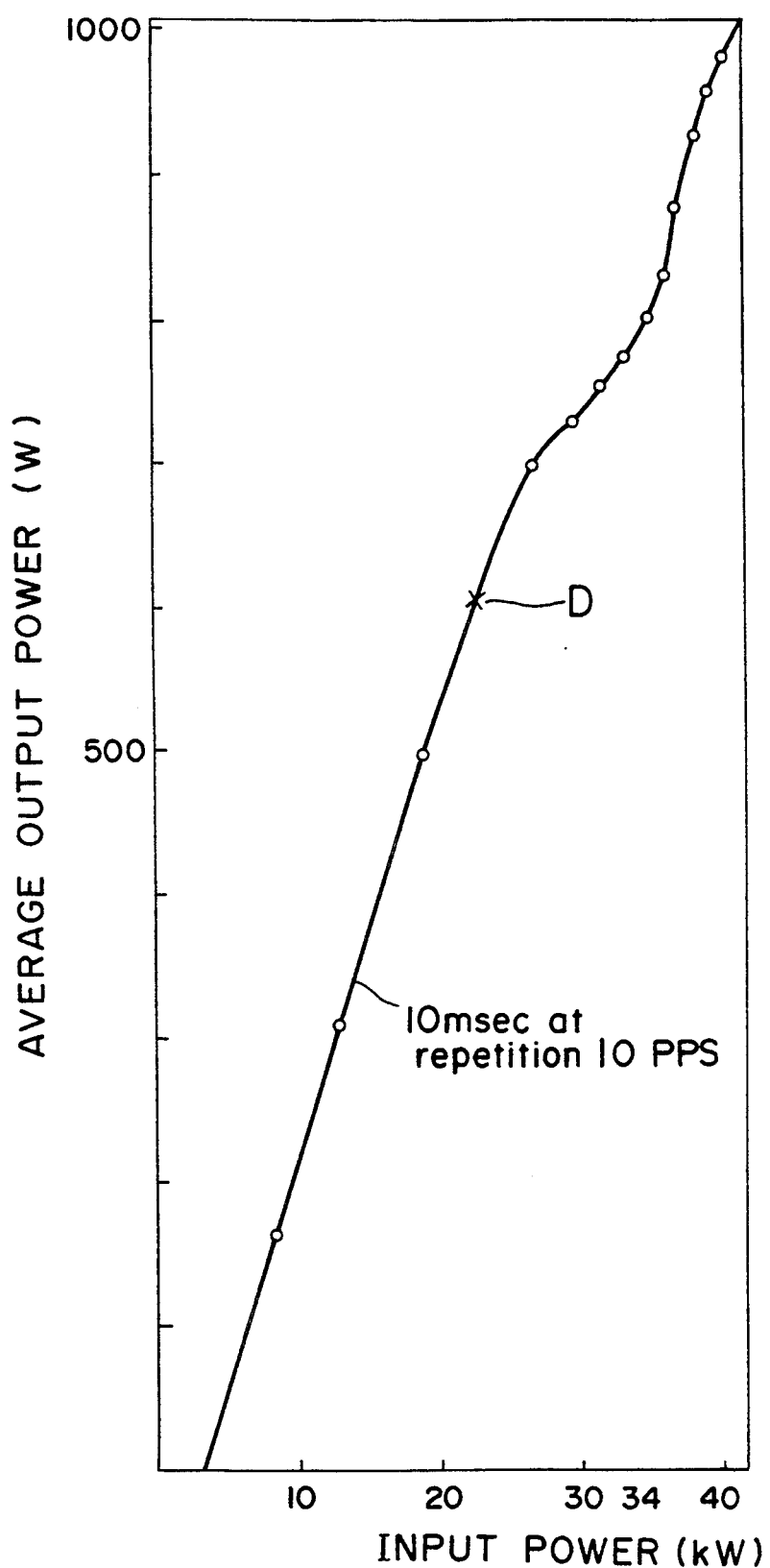
FIG. 7 is a graph showing an average output power (W) vs an input electric power (kW) in the solid-state laser device of the second invention.

FIG. 7 is a graph showing an average output power (W) vs. an input power in the laser device of this embodiment. In this figure, in the case of a conventional laser device in which the laser rod 2 is fixed completely, the rod was destroyed at point D, while in the laser device of this embodiment, the rod 2 was not destroyed and there could be obtained a larger output power.

EXAMPLE 4

Figure 8:
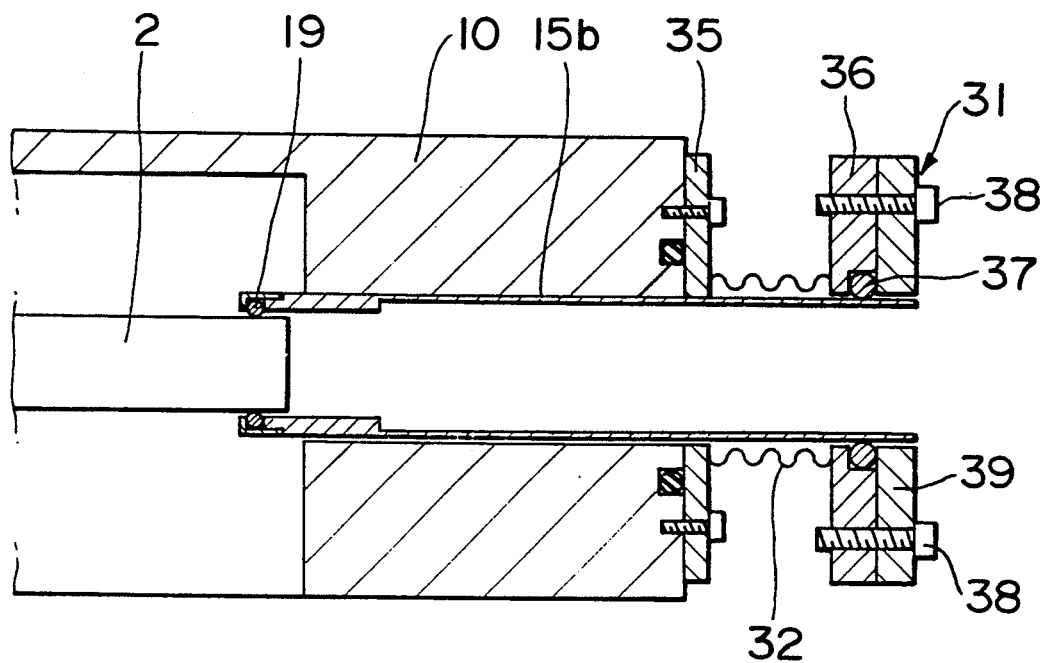
FIG. 8 is a front view in vertical section showing a second embodiment of the solid-state laser device according to the second invention.

Example 4 will be described below with reference to FIG. 8. This figure corresponds to FIG. 3 except that the right-hand half was modified. The left-hand half thereof is the same in FIG. 3.

In this embodiment, the other movable rod holder 15b mentioned above holds an end portion of the laser medium in a liquid-tight manner at one end portion thereof, while the other end portion thereof is projecting from the resonator body 10 and is held by an auxiliary fixing member 31. The auxiliary fixing member 31 is connected to the resonator body through an elastic connector 32 such as bellows or diaphragm seal.

The connector 32 keeps a surrounding portion of the rod holder liquid-tight and it is provided at one end thereof with a fixing ring 35 which is fixed to the resonator body 10 and is also provided at the other end thereof with an O-ring holder 36 which is a constituent element of the auxiliary fixing member 31. The O-ring holder 36 is provided inside with an O-ring 37 which is fitted on the outer periphery of the rod holder 15b in a liquid-tight manner. Further, a ring-like flange 39 is fixed to the O-ring holder 36 with bolts 38. The flange 39 and the O-ring holder 36 the O-ring 37 therebetween.

In this embodiment, when the laser rod 2 expands and extends in its longitudinal direction, the rod holder 15b moves in its longitudinal direction, so that the bellows as the connector 32 extends and absorbs the expansion of the laser rod 2. The other constituent members and effects are the same as in Example 3, so the same reference numerals as in Example 3 are affixed to those constituent members and explanation thereof will be omitted.

EXAMPLE 5

Figure 9:
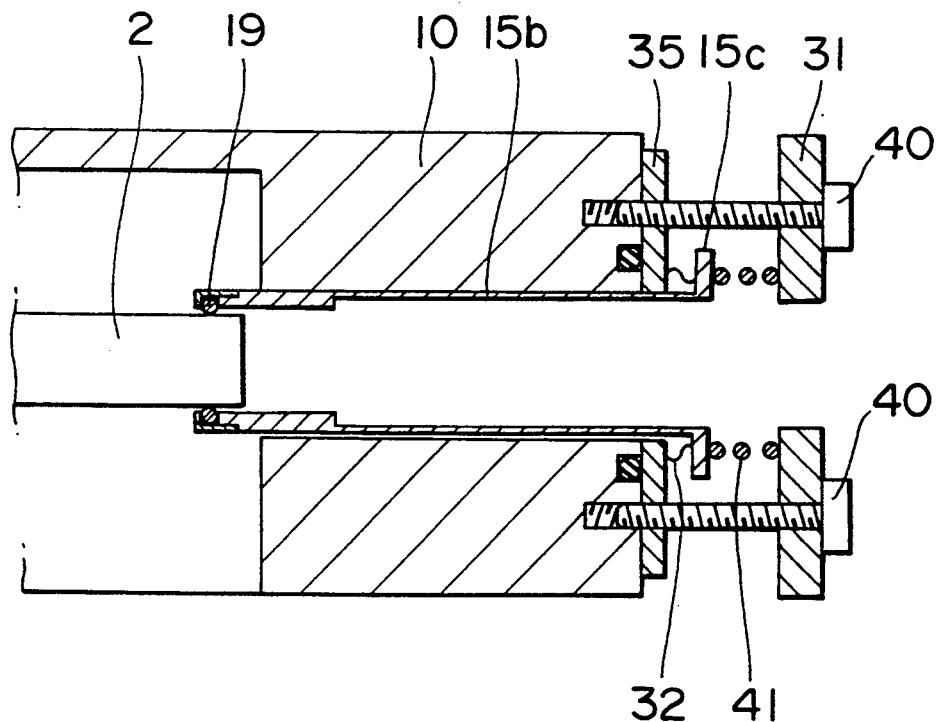
FIG. 9 is a front view in vertical section showing a third embodiment of the solid-state laser device according to the second invention.

Example 5 will be described below with reference to FIG. 9. This figure also corresponds to FIG. 3 except that the right-hand half was modified. The structure of the left-hand half is the same as in FIG. 3.

In this embodiment, the other movable rod holder 15b mentioned above holds an end portion of the laser medium in a liquid-tight manner at one end portion thereof, while the other end portion thereof is projecting from the resonator body 10, and with a flange 15c being formed around the periphery of the said other end portion. Between the flange 15c and the resonator body 10 is interposed an elastic connector 32 such as bellows or diaphragm seal to keep the outer periphery of the rod holder 15b liquid-tight.

Further, a ring plate 31 which constitutes an auxiliary fixing member is mounted to the resonator body 10 with adjusting bolts 40 in an opposed relation to the flange 15c. The spacing between the ring plate 31 and the resonator body 10 can be adjusted by forward and backward movements of the adjusting bolts 40. Between the ring plate 31 and the flange 15c is interposed a biasing spring 41, whereby the flange 15c is urged in a direction in which the rod holder 15c is pushed into the resonator body 10.

When the laser rod 2 expands and extends in its longitudinal direction, the rod holder 15b moves longitudinally against the biasing spring 41 and absorbs the expansion of the laser rod. In this embodiment, the laser medium is held by the rod holder 15b, which in turn is fixed resiliently by the spring 41. Therefore, even in the event shock is applied to the entire laser device, it can be absorbed, and thus this construction is effective in the protection of the laser medium.

The length and diameter of the laser rod 2 used are 185 mm and 10 mm, respectively. The other constituent members and effects than those just mentioned above are the same as in Example 3, so the same reference numerals are affixed thereto and explanation thereof will be omitted.

It is also possible to apply the holding means used in this embodiment to the left-hand side of FIG. 3 and fix both ends of the rod holders 15a and 15b each by the spring 41.

EXAMPLE 6

Figure 10:
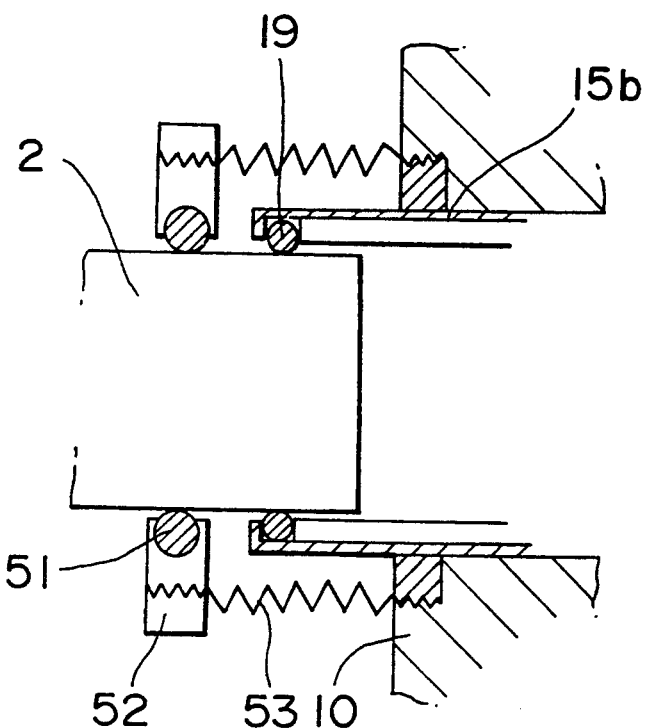
FIG. 10 is a front view in vertical section showing a fourth embodiment of the solid-state laser device according to the second invention.
Figure 11:
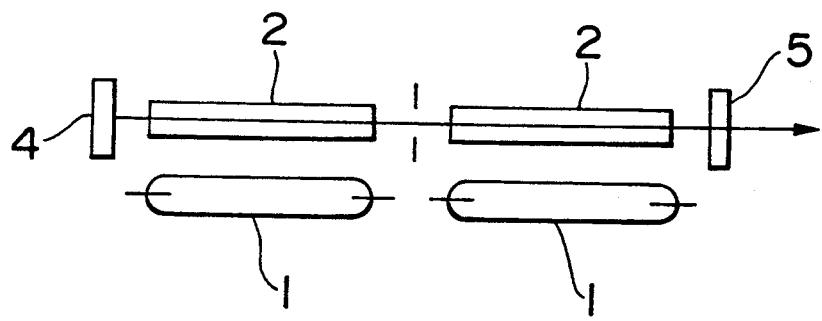
FIG. 11 is a schematic view of a conventional laser device of a cascade structure.
Figure 12:
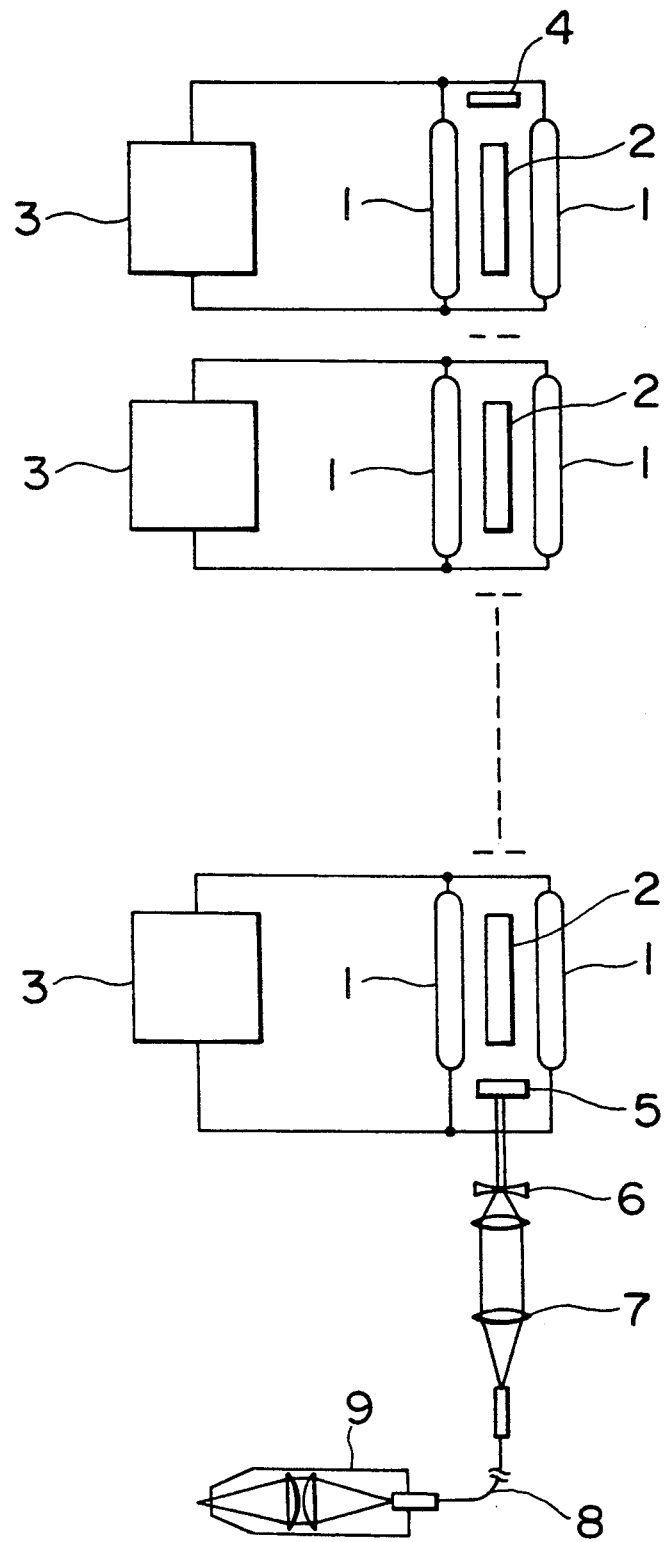
FIG. 12 is a schematic view of a conventional machining apparatus using laser of a series type structure.
Figure 13:
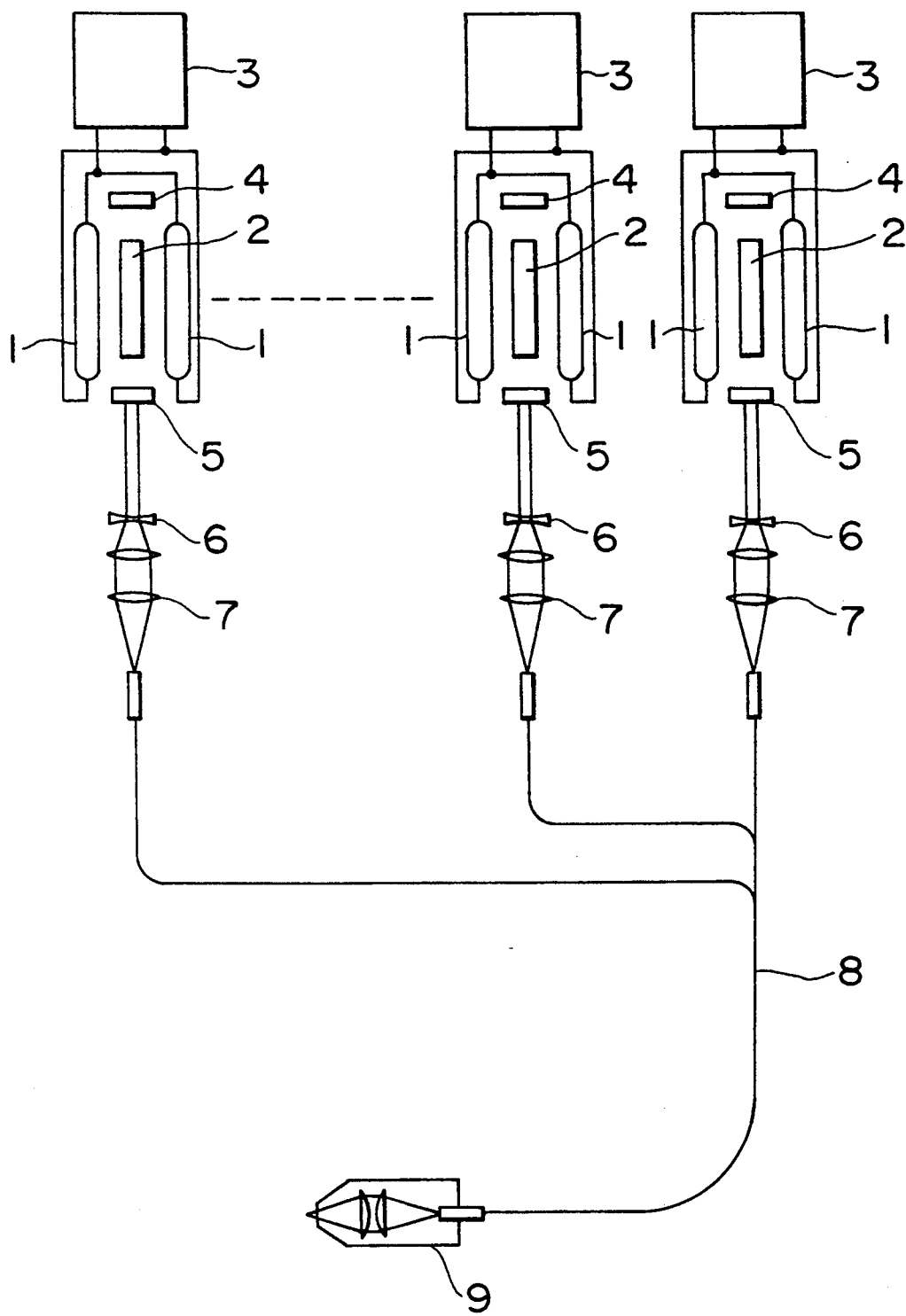
FIG. 13 is a schematic view of a machining apparatus using laser of a parallel type structure.

Example 6 will be described below with reference to FIG. 10.

In this Example there is used a fixed rod holder 15b, and a laser rod 2 is slidable with respect to the rod holder 15b. More specifically, an O-ring 19 holds an end portion of the laser rod 2 slidably. In this construction, the expansion of the laser rod 2 is absorbed by projection thereof inwards of the rod holder 15b.

When the O-ring 19 holds an end portion of the laser rod 2 slidably, there is a fear of liquid tightness becoming unstable, so in order to ensure liquid tightness, an O-ring 51 capable of securing liquid tightness is provided in an O-ring holder 52 and in this state it is mounted on the end portion of the laser rod 2; further, a bellows 53 is provided between the O-ring holder 52 and the resonator body 10.

When the laser rod 2 expands and extends in its longitudinal direction, it moves longitudinally within the rod holder 15b, whereby the expansion thereof is absorbed. The length and diameter of the laser rod 2 are 185 mm and 10 mm, respectively.

We claim:

1. A solid-state laser device comprising within a resonator body a light source for excitation and a laser medium which is excited with light radiated from said light source, said laser medium being held in a free state within said resonator body so that a longitudinal direction thereof is coincident with an optical axis direction of a laser beam generated from said laser medium and so that the laser medium is capable of expansion or contraction in said optical axis direction.

2. A solid-state laser device according to claim 1, wherein said laser medium is in the shape of a rod.

3. A solid-state laser device according to claim 1, wherein said laser medium has a length of not less than 180 mm.

4. A solid-state laser device according to claim 1, wherein said laser medium is formed by Nd:YAG.

5. A solid-state laser device according to claim 1, wherein one end portion of said laser medium is held by a first rod holder and an opposite end portion thereof is held by a second rod holder, wherein one of said first rod holder and said second rod holder is held in a free state so that the laser medium is capable of expansion or contraction in the longitudinal direction thereof.

6. A solid-state laser device according to claim 5, wherein said first rod holder which holds the one end portion of said laser medium is fixed, and said second rod holder which holds the opposite end portion of the laser medium is held in a free state so as to be movable in the longitudinal direction of the laser medium.

7. A solid-state laser device according to claim 5, wherein said second rod holder is slidably held by a slide holder means.

8. A solid-state laser device according to claim 5, wherein one of said first and second rod holders is movable and holds an end portion of said laser medium at one end thereof, and the opposite end of the movable rod holder is connected to said resonator body said device further comprising an auxiliary fixing means connected to the resonator body through an elastic connector, and the end of said holder projecting from said resonator body being held by said auxiliary fixing means.

9. A solid-state laser device according to claim 1, wherein said resonator body has rod holders which hold said laser medium in a free state so that the laser medium is capable or expansion or contraction in the longitudinal direction thereof.

10. A solid-state laser device according to claim 9, wherein both end portions of said laser medium are held by the rod holders, at least one of said rod holders holding the laser medium in a free state so that the laser medium is capable of expansion or contraction in the longitudinal direction thereof.

* * * * *

UNITED STATES PATENT AND TRADEMARK OFFICE
CERTIFICATE OF CORRECTION

PATENT NO.   :   5,235,607
DATED        :   August 10, 1993
INVENTOR(S)  :   Minoru Kojima, et al.

It is certified that error appears in the above-identified patent and that said Letters Patent is hereby corrected as shown below:

Change cover sheet (73) Assignee: from:

"Mitsui Petrochemical Industries, Ltd., Tokyo, Japan" to --Mitsui Petrochemical Industries, Ltd., Tokyo, Japan and Miyachi Technos Corporation, Chiba, Japan--.

Signed and Sealed this

Twenty-fourth Day of May, 1994

Attest:

BRUCE LEHMAN

Attesting Officer         Commissioner of Patents and Trademarks